(12) United States Patent
Son et al.

(10) Patent No.: US 11,338,664 B2
(45) Date of Patent: May 24, 2022

(54) VEHICLE WHEEL HAVING A SUSPENSION AND A STEERING DEVICE

(71) Applicants: HYUNDAI MOTOR COMPANY, Seoul (KR); KIA MOTORS CORPORATION, Seoul (KR)

(72) Inventors: Seong Hyun Son, Changwon-si (KR); Mi Yong Lee, Hwaseong-si (KR); Dae Jin Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 95 days.

(21) Appl. No.: 16/854,269

(22) Filed: Apr. 21, 2020

(65) Prior Publication Data

US 2021/0122228 A1    Apr. 29, 2021

(30) Foreign Application Priority Data

Oct. 25, 2019    (KR) ........................ 10-2019-0133398

(51) Int. Cl.
  *B60K 7/00*    (2006.01)
  *B60G 15/06*   (2006.01)
  *B62D 5/04*    (2006.01)

(52) U.S. Cl.
  CPC .......... *B60K 7/0007* (2013.01); *B60G 15/066* (2013.01); *B62D 5/0418* (2013.01)

(58) Field of Classification Search
  CPC .......... B60K 7/0007; B60K 2007/0038; B60G 15/066; B60G 3/00; B62D 7/06
  See application file for complete search history.

(56) References Cited

U.S. PATENT DOCUMENTS

| 1,997,974 | A | * | 4/1935 | Moore | ................ | B60K 7/0007 310/67 R |
| 3,578,354 | A | * | 5/1971 | Schott | ...................... | B60G 3/01 280/124.126 |
| 6,113,119 | A | * | 9/2000 | Laurent | ................... | B60G 3/01 280/124.1 |
| 8,746,383 | B2 | * | 6/2014 | Basadzishvili | .......... | B60G 3/01 180/65.51 |
| 9,145,169 | B2 | | 9/2015 | Suh | | |
| 10,173,463 | B2 | * | 1/2019 | Barel | .................... | F16F 9/0245 |
| 2002/0100625 | A1 | * | 8/2002 | Beltrame | ........... | H02K 11/0094 180/65.51 |
| 2004/0099455 | A1 | * | 5/2004 | Nagaya | ................... | B60G 3/20 180/65.51 |

(Continued)

FOREIGN PATENT DOCUMENTS

JP    2005289321 A    10/2005
JP    2007186052 A    7/2007

(Continued)

*Primary Examiner* — Frank B Vanaman
(74) *Attorney, Agent, or Firm* — Lempia Summerfield Katz LLC

(57) ABSTRACT

A vehicle wheel having a suspension and a steering device is capable of not only simplifying a driving system but also reducing the number of parts and reducing weight. The vehicle wheel includes a suspension combined with a damper and a spring in a housing of a stator of an in-wheel motor embedded in each wheel of a vehicle and a steering device directly connected to the suspension.

18 Claims, 7 Drawing Sheets

(56) References Cited

U.S. PATENT DOCUMENTS

2008/0100020 A1\* 5/2008 Gashi .................. B60K 7/0007
280/124.127
2016/0068016 A1\* 3/2016 Winshtein ................ B60G 3/01
301/6.5

FOREIGN PATENT DOCUMENTS

| KR | 101127736 B1 | 3/2012 |
| KR | 20190059694 A | 5/2019 |

\* cited by examiner

VEHICLE WHEEL HAVING A SUSPENSION AND A STEERING DEVICE

CROSS-REFERENCE TO RELATED APPLICATION

This application claims under 35 U.S.C. § 119(a) the benefit of priority to Korean Patent Application No. 10-2019-0133398 filed on Oct. 25, 2019, the entire contents of which are incorporated herein by reference.

BACKGROUND

(a) Technical Field

The present disclosure relates to a vehicle wheel having a suspension and a steering device. More particularly, it relates to a wheel having a suspension and a steering device of a new structure in which suspension parts for absorbing an impact of a road surface and steering parts for steering are mounted on a driving wheel of a vehicle.

(b) Background

As eco-friendly future transportation, autonomous driving electric vehicles as well as electric wheels, electric scooters, Segway devices, electric bicycles, and the like as personal mobility type vehicles have been researched and developed for various purposes and in various forms.

For example, as tendencies for future vehicles to rapidly move a short distance in an urban area increases, an in-wheel motor embedding a battery-powered motor in a driving wheel has been released. Further, a so-called geo orbital wheel, in which a battery and a motor are embedded in a driving wheel of a bicycle, has been released.

For reference, a motor used in the in-wheel motor is a direct drive motor. The direct drive motor includes a rotor mounted in a rim of a driving wheel, and a stator disposed in an inner diameter portion of the rotor.

Thus, when a current is applied to the in-wheel motor and thus the rotor rotates, a tire mounted on an outer diameter portion of the rim of a driving wheel, in addition to the driving wheel, is rotated such that driving of a vehicle may be performed.

However, since an inner space of the driving wheel is limited when the in-wheel motor is applied to the vehicle, a suspension link and a spring damper, which constitute a suspension, are separately installed on a vehicle body. Accordingly, there is a problem in that a weight of the vehicle body is inevitably increased and a complicated vehicle body structure design is required.

Further, since a vibration and an impact of a road surface are directly delivered to the driving wheel while the vehicle is driving, the vibration and impact become a cause of degradation in durability of the in-wheel motor mounted in the driving wheel.

Therefore, there is a need for a method which is capable of simplifying a driving system of a vehicle and protecting an in-wheel motor and the like by directly installing a suspension and the like in a driving wheel.

SUMMARY OF THE DISCLOSURE

The present disclosure has been made in an effort to solve the above-described problems associated with the prior art.

In one aspect, the present disclosure provides a vehicle wheel having a suspension and a steering device, which is capable of not only simplifying a driving system but also reducing the number of parts and reducing weight by installing a suspension combined with a damper and a spring in a housing of a stator of an in-wheel motor embedded in each wheel of a vehicle and directly connecting a steering device to the suspension.

In an embodiment, the present disclosure provides a vehicle wheel having a suspension and a steering device, which includes: an in-wheel motor including a rotor mounted on an inner diameter portion of a rim of a driving wheel and a stator disposed on an inner diameter portion of the rotor; a vehicle body mounting plate mounted at a predetermined position of a vehicle body; a tilting hub tiltably connected by the vehicle body mounting plate and a steering device and disposed at a central portion of the rim; a plurality of dampers, each damper of the plurality of dampers having one end portion fixed to an inner diameter portion of a housing of the stator and another end portion fixed to an outer surface of the tilting hub; and a spring elastically supported by being connected between the inner diameter portion of the housing of the stator and the outer surface of the tilting hub.

A line connection terminal may be formed in the vehicle body mounting plate to supply battery power to the in-wheel motor and an actuator of the steering device.

Further, the tilting hub may be provided in a form of a triangular block, and a concave spring support surface may be formed on each outer surface of the triangular block so as to support one end portion of the spring.

Further, the damper may include a first cylinder in which a damping fluid is stored and a first piston mounted to be able to pass into or out of the first cylinder so that the first cylinder of the damper may be fixed to the inner diameter portion of the housing of the stator. The first piston may be fixed to the outer surface of the tilting hub.

Further, the spring may be provided as an elliptical plate spring to be disposed at a side of the damper, and, simultaneously, is connected between the inner diameter portion of the housing of the stator and the outer surface of the tilting hub.

Further, the steering device may include a steering support shaft having one end portion rotatably connected to a central portion of the tilting hub and another end portion fixed to a central portion of the vehicle body mounting plate. The steering device may also include a plurality of steering actuators rotatably connected between an outer circumferential portion of the vehicle body mounting plate and an outer circumferential portion of the tilting hub and configured to steer the tilting hub at a predetermined angle.

The one end portion of the steering support shaft may be rotatably connected to a central portion of an inner surface of the tilting hub through a ball joint.

The steering actuator may be employed as an electric actuator in which a second piston is mounted to be movable reciprocatively in a second cylinder. The second cylinder of the steering actuator may be connected to the outer circumferential portion of the vehicle body mounting plate through a ball joint. The second piston may be rotatably connected to the outer circumferential portion of the tilting hub through a ball joint.

Other aspects and embodiments of the present disclosure are discussed below.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the present disclosure are discussed below.

BRIEF DESCRIPTION OF THE DRAWINGS

The above and other features of the present disclosure will now be described in detail with reference to certain embodiments thereof illustrated in the accompanying drawings which are given hereinbelow by way of illustration only, and thus are not limitative of the present disclosure, and wherein.

Figure 1:
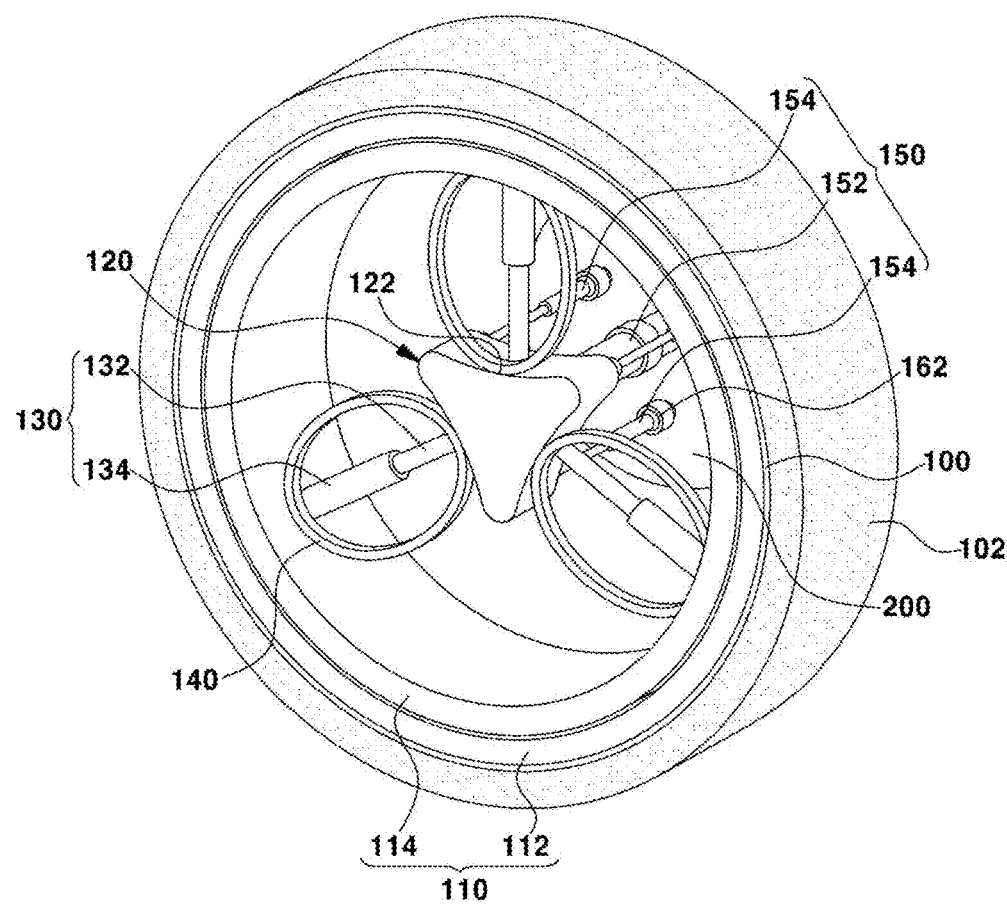
FIG. 1 is a front perspective view illustrating a vehicle wheel having a suspension and a steering device according to the present disclosure.
Figure 2:
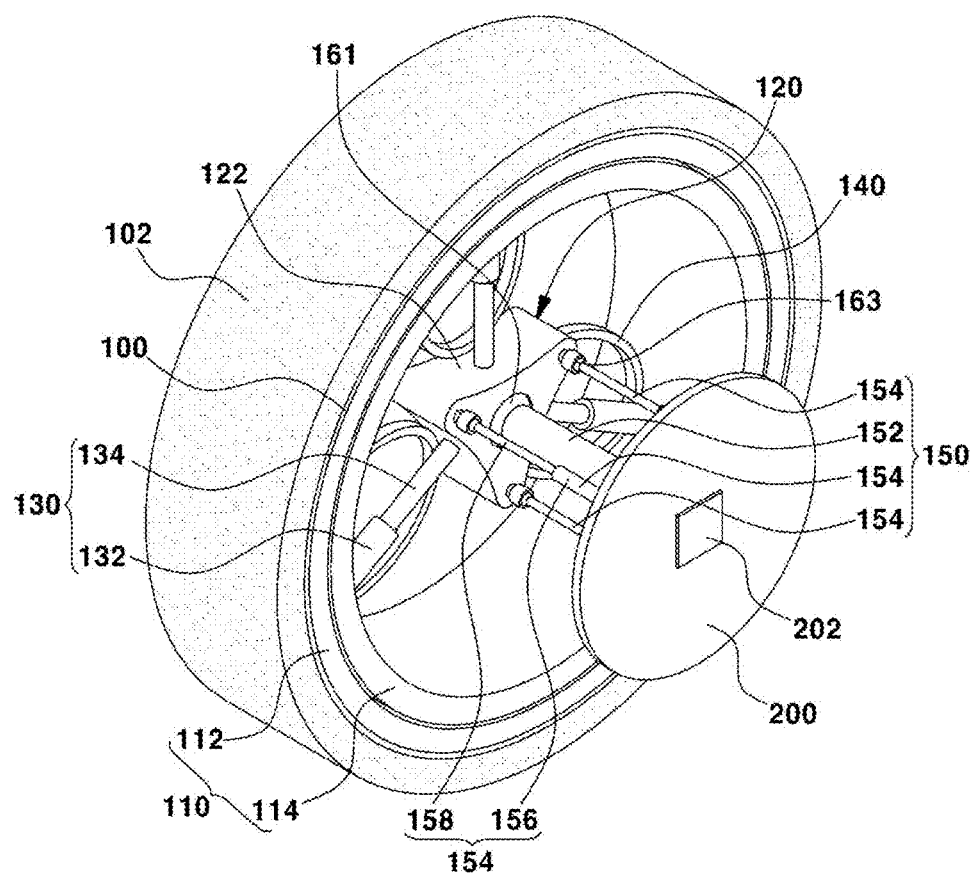
FIG. 2 is a rear perspective view illustrating the vehicle wheel having a suspension and a steering device according to the present disclosure.
Figure 3:
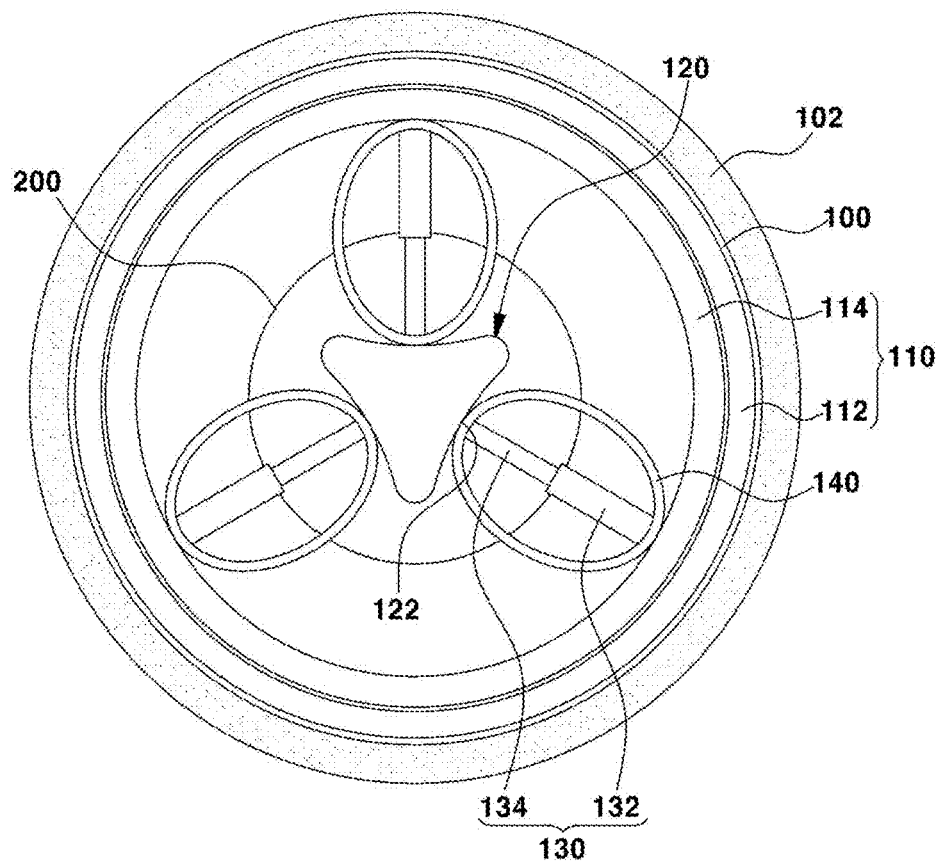
FIG. 3 is a front view illustrating the vehicle wheel having a suspension and a steering device according to the present disclosure.
Figure 4:
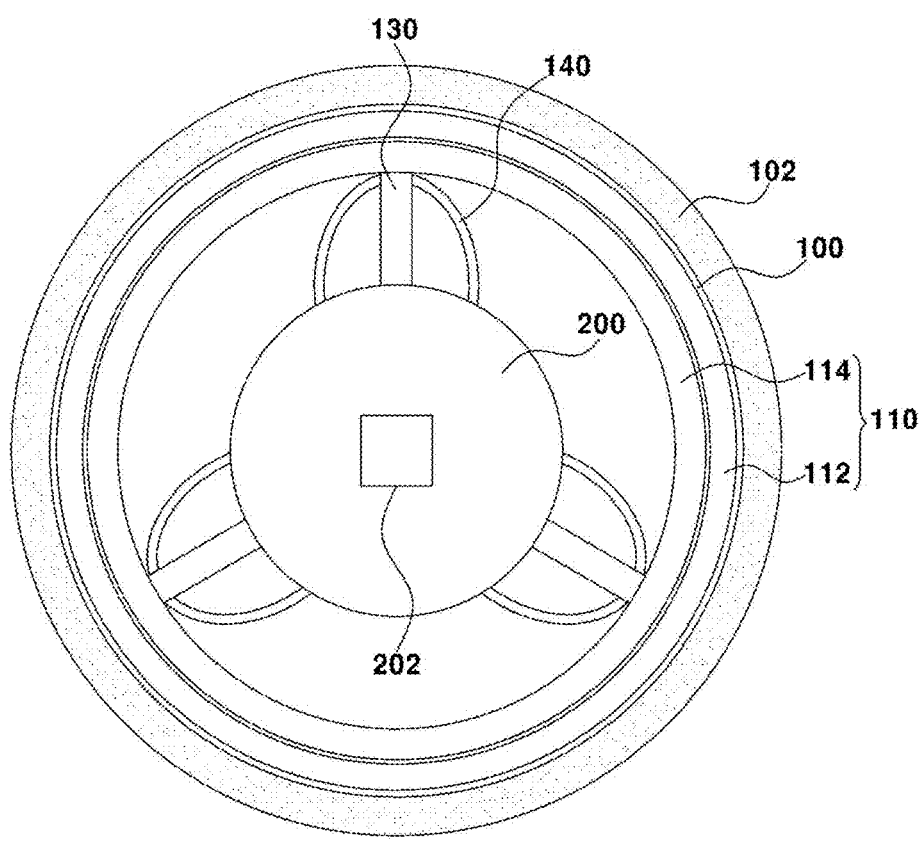
FIG. 4 is a rear view illustrating the vehicle wheel having a suspension and a steering device according to the present disclosure.
Figure 5:
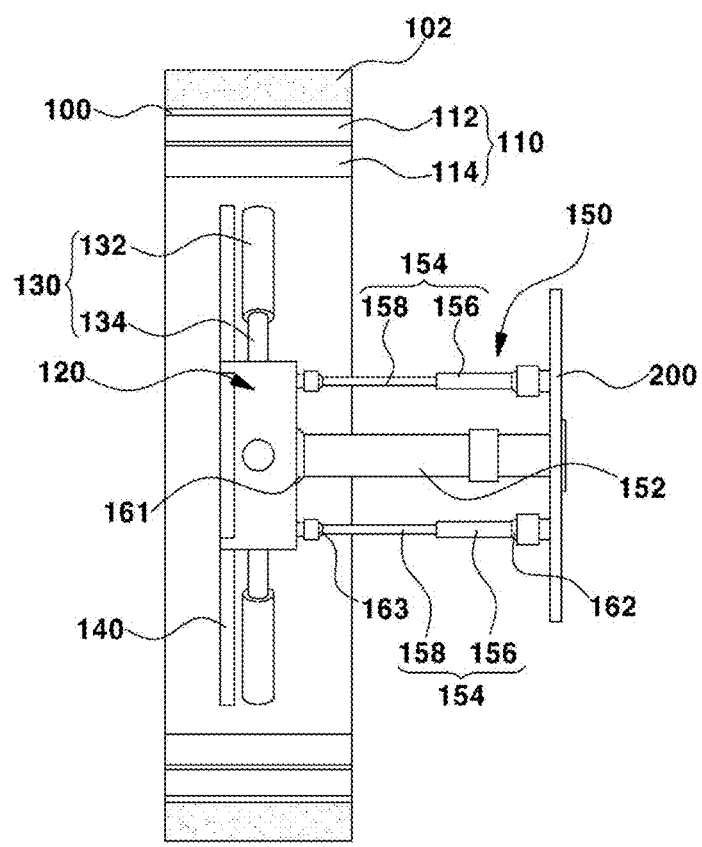
FIG. 5 is a plan cross-sectional view illustrating the vehicle wheel having a suspension and a steering device according to the present disclosure.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes maybe determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below. While the present disclosure is described in conjunction with various embodiments, it should be understood that the present description is not intended to limit the present disclosure to those embodiments. On the contrary, the present disclosure is intended to cover not only the disclosed embodiments, but also various alternatives, modifications, equivalents and other embodiments, which may be included within the spirit and scope of the present disclosure as defined by the appended claims.

Hereinafter, various embodiments of the present disclosure are described in detail with reference to the accompanying drawings.

FIGS. 1-5 illustrate a vehicle wheel having a suspension and a steering device according to the present disclosure. Reference numeral 100 denotes a rim of a driving wheel.

The rim 100 of a driving wheel has a cylindrical shape, and a tire 102 is mounted on an outer diameter portion of the rim 100.

Further, a typical in-wheel motor 110 is mounted in the rim 100 of a driving wheel.

The in-wheel motor 110 is a direct drive motor. The direct drive motor includes a rotor 112 mounted in an inner diameter portion of the rim 100 of a driving wheel and a stator 114 disposed in an inner diameter of the rotor 112.

Thus, when a current is applied to the in-wheel motor 110 and thus the rotor 112 rotates, the tire 102 mounted on the outer diameter portion of the rim 100 of a driving wheel in addition to the rim 100 of a driving wheel is rotated such that driving of a vehicle may be performed.

According to the present disclosure, a tilting hub 120 is disposed to be steerable at a central portion of the rim 100, and a vehicle body mounting plate 200 is fixedly mounted at a predetermined position of a vehicle body.

Further, as described below, a steering device 150 for steering the tilting hub 120 is connected between the tilting hub 120 and the vehicle body mounting plate 200.

A line connection terminal 202 is formed on the vehicle body mounting plate 200 to supply battery power to the in-wheel motor 110 and an actuator 154 of the steering device 150.

For example, a line connector connected to a battery is engaged with the line connection terminal 202, and a line extending from the line connection terminal 202 is connected to a coil included in the stator 114 of the in-wheel motor 110 such that the battery power may be suppliable to the in-wheel motor 10.

In particular, as a suspension which is capable of immediately absorbing a driving vibration and an impact which are delivered from the tire 102, a plurality of dampers 130 and a plurality of springs 140 are connected between the tilting hub 120 and a housing of the stator 114.

The damper 130 includes a first cylinder 132 in which a damping fluid is stored and a first piston 134 mounted to be able to pass into or out of the first cylinder 132. The spring 140 is provided as an elliptical plate spring.

In this case, one end portion of each damper 130 of the plurality of dampers 130 is fixed to an inner diameter portion of the housing of the stator 114, and the other end portion of each damper 130 thereof is fixed to an outer surface of the tilting hub 120.

The first cylinder 132 of the damper 130 is fixed to the inner diameter portion of the housing of the stator 114, and the first piston 134 is fixed to the outer surface of the tilting hub 120.

Further, the spring 140 is provided as an elliptical plate spring to be disposed at a side of the damper 130, and, at the same time, one end portion of the spring 140 is connected to the inner diameter portion of the housing of the stator 114 and the other end portion of the spring 140 thereof is fixed to the outer surface of the tilting hub 120.

The tilting hub 120 is provided in the form of a triangular block. A concave spring support surface 122 is formed on each outer surface of the triangular block so as to easily support and fix the other end portion of the spring 140 (a curved surface of one side of the elliptical plate spring).

The steering device 150 is a device for steering the tilting hub 120. The steering device 150 includes a steering support shaft 152 connected between the tilting hub 120 and a central portion of the vehicle body mounting plate 200. The steering device 150 includes a plurality of steering actuators 154 connected between the tilting hub 120 and an outer circumferential portion of the vehicle body mounting plate 200.

One end portion of the steering support shaft 152 is rotatably connected to a central portion of the tilting hub 120, and the other end portion of the steering support shaft 152 thereof is fixed to the central portion of the vehicle body mounting plate 200.

Further, the steering actuator 154 is rotatably connected between the tilting hub 120 and the outer circumferential portion of the vehicle body mounting plate 200 so as to steer the tilting hub 120 at a predetermined angle.

One end portion of the steering support shaft 152 is rotatably connected to a central portion of an inner surface of the tilting hub 120 through a first ball joint 161.

The steering actuator 154 is employed as an electric actuator in which a second piston 158 is mounted to be movable reciprocatively in a second cylinder 156.

Thus, the second cylinder 156 of the steering actuator 154 is connected to the outer circumferential portion of the vehicle body mounting plate 200 through a second ball joint 162, and the second piston 158 is rotatably connected to an outer circumferential portion of the tilting hub 120 through a third ball joint 163.

An operating state of the wheel having a suspension and a steering device of the present disclosure, which has the above-described configuration, is described below.

First, when battery power is supplied to the line connection terminal 202 of the vehicle body mounting plate 200, a current is applied to the coil included in the stator 114 of the in-wheel motor 110 through the line extending from the line connection terminal 202 such that the rotor 112 of the in-wheel motor 110 is driven to rotate.

Accordingly, when the rotor 112 rotates due to application of the current to the in-wheel motor 110, the tire 102 mounted on the outer diameter portion of the rim 100 of a driving wheel in addition to the rim 100 of a driving wheel is rotated such that driving of a vehicle is performed.

In this case, while the vehicle is driving, a vibration and an impact of a road surface may be directly delivered to the in-wheel motor 110 through the tire 102 and the rim 100 of a driving wheel.

As described above, even when the vibration and the impact of the road surface are directly delivered to the in-wheel motor 110, the damper 130 and the spring 140, which are connected between the housing of the stator 114 of the in-wheel motor 110 and the tilting hub 120, absorb directly and dually the vibration and the impact.

In other words, an operation in which the first piston 134 protrudes from the first cylinder 132 of the damper 130 or the first piston 134 is inserted into the first cylinder 132 is repeated, and, simultaneously, a compression and elastic restoring operation of the spring 140 is repeated such that it is possible to immediately absorb the vibration and the impact of the road surface during driving.

As described above, during driving, the vibration and the impact of the road surface may be immediately absorbed in the damper 130 and the spring 140 such that the in-wheel motor 110 may be protected from the vibration and the impact and thus it is possible to prevent degradation in durability of the in-wheel motor 110 due to the vibration and the impact.

In this case, while the vehicle is driving, independent steering of each wheel (four wheels) may be performed by the steering device 150.

Figure 6:
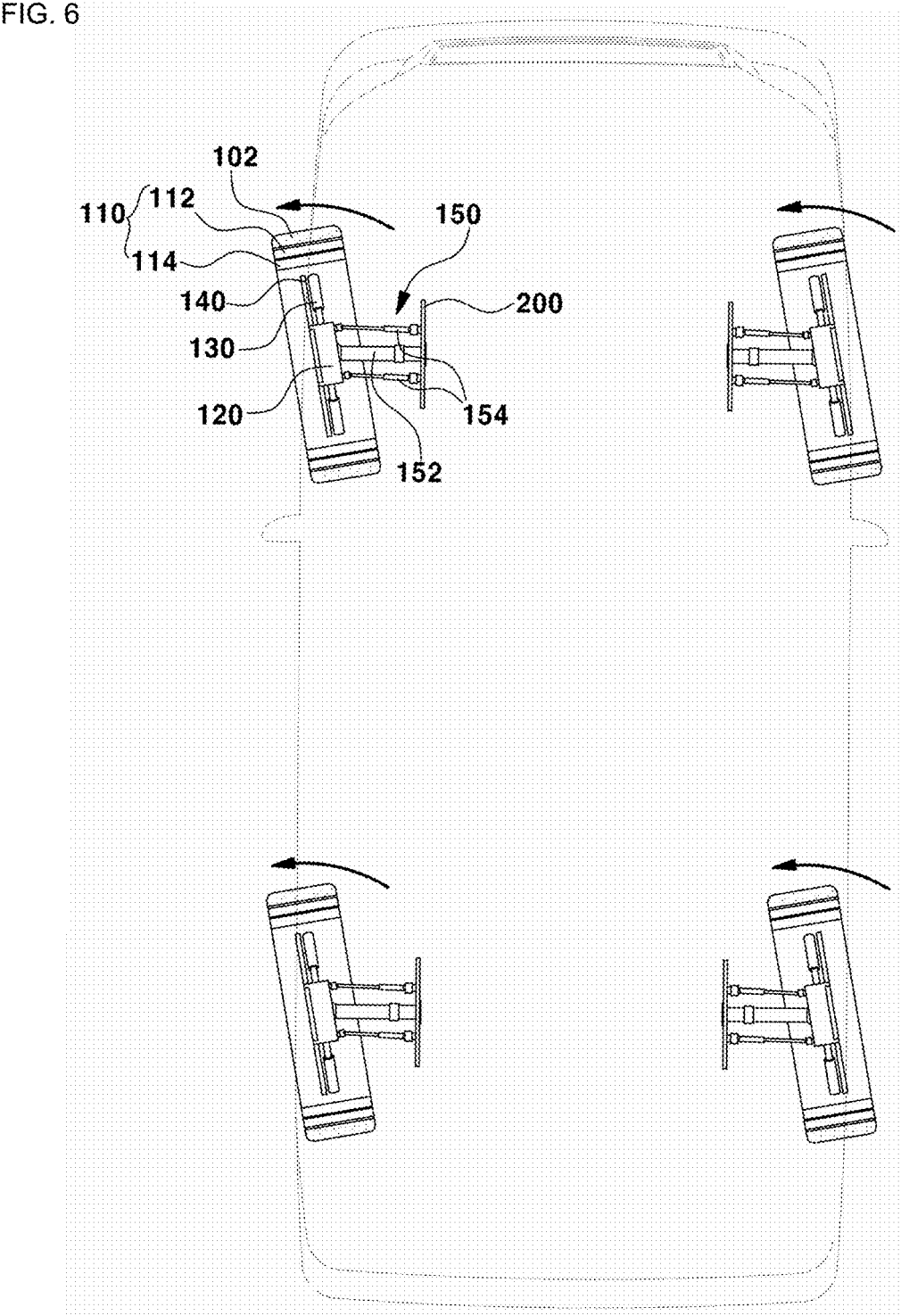
FIG. 6 is a plan view illustrating a steering operation of the vehicle wheel having a suspension and a steering device according to the present disclosure.
Figure 7:
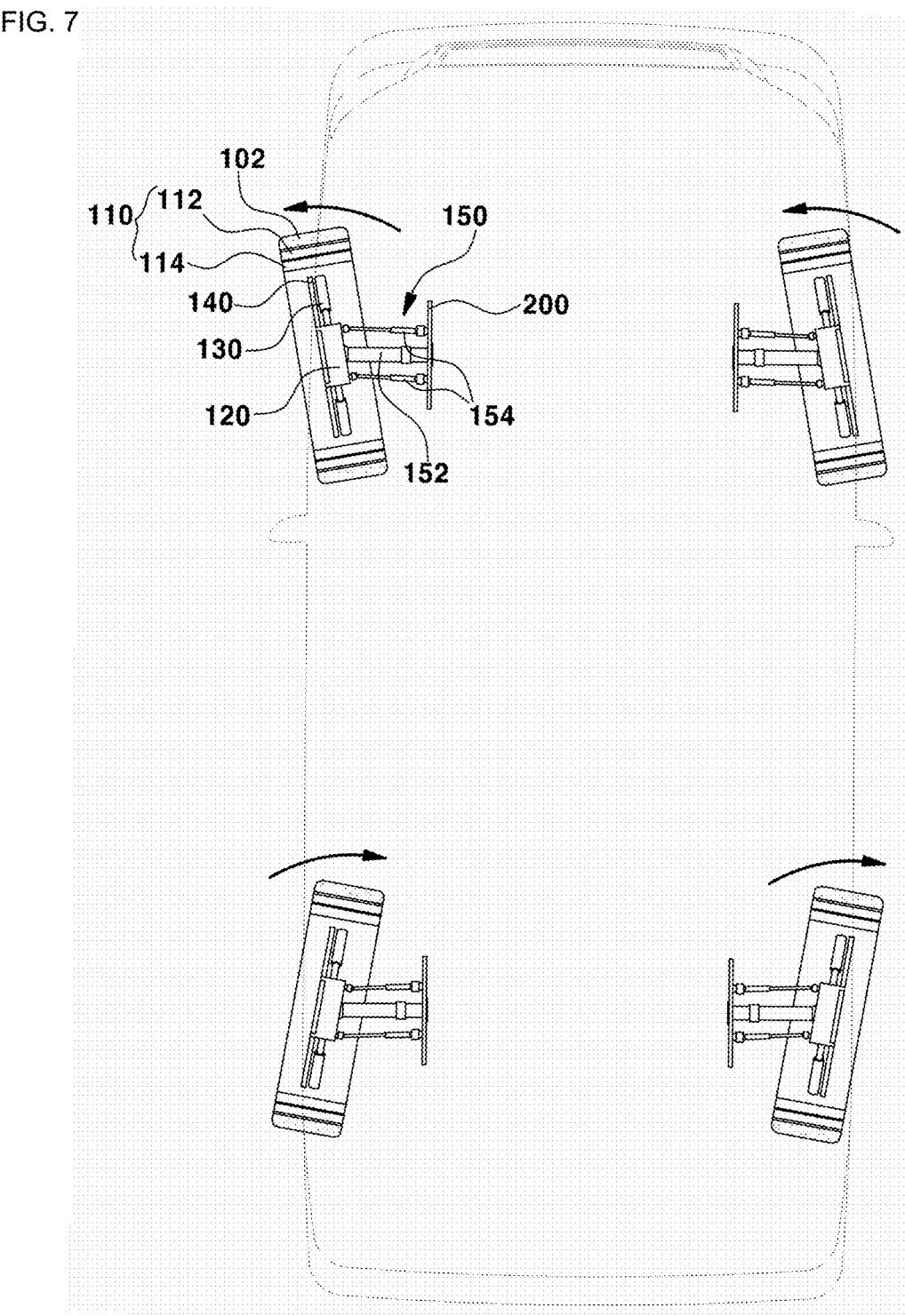
FIG. 7 is a plan view illustrating the steering operation of the vehicle wheel having a suspension and a steering device according to the present disclosure.

FIGS. 6 and 7 illustrate a steering operation of the vehicle wheel having a suspension and a steering device according to the present disclosure.

When a driver steers a steering wheel, a controller receives a steering angle detection signal of the steering wheel and applies a current for operation to the steering actuator 154.

In this case, as described above, three steering actuators 154 may be provided to be rotatably connected between the tilting hub 120 and the outer circumferential portion of the vehicle body mounting plate 200 and may be respectively disposed at a front side, an intermediate side, and a rear side in a length direction of the vehicle.

Thus, when the driver steers the steering wheel to a left side for turning left, a second piston 158 of the front steering actuator 154 among the three steering actuators 154 is moved forward to push the tilting hub 120 in a front direction, and, simultaneously, a second piston 158 of the rear steering actuator 154 is moved backward to pull the tilting hub 120 in a rear direction such that left steering of the tilting hub 120 is performed.

At the same time, left steering of the in-wheel motor 110 connected through the tilting hub 120, the damper 130, and the spring 140 is performed at the same angle, and the rim 100 of a driving wheel coupled to the rotor 112 of the in-wheel motor 110 and the tire 102 of an outer diameter portion of the in-wheel motor 110 also perform a left steering operation.

When the driver steers the steering wheel to a right side for turning right, a second piston 158 of the front steering actuator 154 among the three steering actuators 154 is moved backward to pull the tilting hub 120 in the front direction, and, simultaneously, the second piston 158 of the rear steering actuator 154 is moved forward to push the tilting hub 120 in the rear direction such that right steering of the tilting hub 120 is performed.

At the same time, right steering of the in-wheel motor 110 connected through the tilting hub 120, the damper 130, and the spring 140 is performed at the same angle, and the rim 100 of a driving wheel coupled to the rotor 112 of the in-wheel motor 110 and the tire 102 of the outer diameter portion of the in-wheel motor 110 also perform a right steering operation.

Since the steering device 150 is mounted on each of four wheels mounted in the vehicle, independent steering of the four wheels is possible.

Consequently, as shown in FIG. 6, when the driver steers the steering wheel to the right side or the left side to perform the right or left steering of a front wheel, a rear wheel is also steered in the same direction of the front wheel such that it is possible to reduce a turning radius of the vehicle. Consequently, driving stability of the vehicle may be improved.

As shown in FIG. 7, when the driver steers the steering wheel to the right side or the left side to perform the right or left steering of a front wheel, steering of the rear wheel is performed in a direction opposite the direction of the front wheel such that it is possible to provide an advantage of allowing rapid turning driving of the vehicle.

As described above, a suspension combined with a damper and a spring is installed on a housing of a stator of an in-wheel motor embedded in each wheel of a vehicle, and a steering device is directly connected to the suspension such that it is possible to not only immediately absorb a vibration and an impact of a road surface during driving, but also improve steering performance.

The present disclosure provides the following effects through the above-described problem-solving means.

First, a suspension combined with a damper and a spring is installed on a housing of a stator of an in-wheel motor embedded in each wheel of a vehicle, and a steering device is directly connected to the suspension such that it is possible to not only simplify a driving system, which includes exclusion of a drive shaft, but also reduce the number of parts and reduce weight because suspension chassis parts separately installed in the vehicle may be unnecessary.

Second, the suspension combined with the damper and the spring and the steering device are directly installed on a wheel of personal mobility type vehicles, such as an electric wheel, an electric scooter, a Segway, an electric bicycle, and the like, such that it is possible to satisfy driving performance of the personal mobility type vehicles and variety demand.

Third, independent driving and steering of each wheel is possible such that there is an advantage in that four-wheel control is always possible.

Fourth, during braking of the vehicle, when a reverse current is applied to the stator of the in-wheel motor, braking of the wheel is possible such that there is an advantage in that an additional braking device is not needed to be installed.

Fifth, even when a vibration and an impact of a road surface are directly delivered to a driving wheel while the vehicle is driving, the damper and the spring, which are connected between the housing of the stator of the in-wheel motor and a tilting hub, can directly absorb the vibration and the impact such that the in-wheel motor can be protected from the vibration and the impact. Thus, it is possible to prevent degradation in durability of the in-wheel motor due to the vibration and the impact.

The present disclosure has been described in detail with reference to embodiments thereof. However, it can be appreciated by those having ordinary skill in the art that changes may be made in these embodiments without departing from the principles and spirit of the present disclosure, the scope of which is defined in the appended claims and their equivalents.

What is claimed is:

1. A vehicle wheel having a suspension and a steering device, the vehicle wheel comprising:
   an in-wheel motor including a rotor mounted on an inner diameter portion of a rim of a driving wheel and a stator disposed on an inner diameter portion of the rotor;
   a vehicle body mounting plate mounted at a predetermined position of a vehicle body;
   a tilting hub tiltably connected by the vehicle body mounting plate and a steering device, and disposed at a central portion of the rim;
   a plurality of dampers, each having one end portion fixed to an inner diameter portion of a housing of the stator and another end portion fixed to an outer surface of the tilting hub; and
   a spring elastically supported by being connected between the inner diameter portion of the housing of the stator and the outer surface of the tilting hub,
   wherein the tilting hub is provided in a form of a triangular block, and
   wherein a concave spring support surface is formed on an outer surface of the triangular block so as to support one end portion of the spring.

2. The vehicle wheel of claim 1, wherein a line connection terminal is formed in the vehicle body mounting plate to supply battery power to the in-wheel motor and an actuator of the steering device.

3. The vehicle wheel of claim 1, wherein the damper includes a first cylinder in which a damping fluid is stored and a first piston mounted to be able to pass into or out of the first cylinder.

4. The vehicle wheel of claim 3, wherein the first cylinder of the damper is fixed to the inner diameter portion of the housing of the stator, and the first piston is fixed to the outer surface of the tilting hub.

5. The vehicle wheel of claim 1, wherein the spring is provided as an elliptical plate spring to be disposed at a side of the damper, and, simultaneously, is connected between the inner diameter portion of the housing of the stator and the outer surface of the tilting hub.

6. The vehicle wheel of claim 1, wherein the steering device includes:
   a steering support shaft having one end portion rotatably connected to a central portion of the tilting hub and another end portion fixed to a central portion of the vehicle body mounting plate; and
   a plurality of steering actuators rotatably connected between an outer circumferential portion of the vehicle body mounting plate and an outer circumferential portion of the tilting hub, and configured to steer the tilting hub at a predetermined angle.

7. The vehicle wheel of claim 6, wherein the one end portion of the steering support shaft is rotatably connected to a central portion of an inner surface of the tilting hub through a first ball joint.

8. The vehicle wheel of claim 6, wherein the steering actuator is employed as an electric actuator in which a piston is mounted to be movable reciprocatively in a cylinder.

9. The vehicle wheel of claim 8, further comprising two ball joints, wherein:
   the cylinder of the steering actuator is connected to the outer circumferential portion of the vehicle body mounting plate through one of the two ball joints; and
   the piston is rotatably connected to the outer circumferential portion of the tilting hub through the other of the two ball joints.

10. A vehicle wheel having a suspension and a steering device, the vehicle wheel comprising:
    an in-wheel motor including a rotor mounted on an inner diameter portion of a rim of a driving wheel and a stator disposed on an inner diameter portion of the rotor;
    a vehicle body mounting plate mounted at a predetermined position of a vehicle body;
    a tilting hub tiltably connected by the vehicle body mounting plate and a steering device, and disposed at a central portion of the rim;
    a plurality of dampers, each having one end portion fixed to an inner diameter portion of a housing of the stator and another end portion fixed to an outer surface of the tilting hub; and
    a spring elastically supported by being connected between the inner diameter portion of the housing of the stator and the outer surface of the tilting hub,
    wherein the spring is provided as an elliptical plate spring to be disposed at a side of the damper, and, simultaneously, is connected between the inner diameter portion of the housing of the stator and the outer surface of the tilting hub.

11. The vehicle wheel of claim 10, wherein a line connection terminal is formed in the vehicle body mounting plate to supply battery power to the in-wheel motor and an actuator of the steering device.

12. The vehicle wheel of claim 10, wherein:
the tilting hub is provided in a form of a triangular block; and
a concave spring support surface is formed on an outer surface of the triangular block so as to support one end portion of the spring.

13. The vehicle wheel of claim 10, wherein the damper includes a first cylinder in which a damping fluid is stored and a first piston mounted to be able to pass into or out of the first cylinder.

14. The vehicle wheel of claim 13, wherein the first cylinder of the damper is fixed to the inner diameter portion of the housing of the stator, and the first piston is fixed to the outer surface of the tilting hub.

15. The vehicle wheel of claim 10, wherein the steering device includes:
a steering support shaft having one end portion rotatably connected to a central portion of the tilting hub and another end portion fixed to a central portion of the vehicle body mounting plate; and
a plurality of steering actuators rotatably connected between an outer circumferential portion of the vehicle body mounting plate and an outer circumferential portion of the tilting hub, and configured to steer the tilting hub at a predetermined angle.

16. The vehicle wheel of claim 15, wherein the one end portion of the steering support shaft is rotatably connected to a central portion of an inner surface of the tilting hub through a first ball joint.

17. The vehicle wheel of claim 15, wherein the steering actuator is employed as an electric actuator in which a piston is mounted to be movable reciprocatively in a cylinder.

18. The vehicle wheel of claim 17, further comprising two ball joints, wherein:
the cylinder of the steering actuator is connected to the outer circumferential portion of the vehicle body mounting plate through one of the two ball joints; and
the piston is rotatably connected to the outer circumferential portion of the tilting hub through the other of the two ball joints.

* * * * *